(12) United States Patent
Bjoentegaard

(10) Patent No.: US 8,989,276 B2
(45) Date of Patent: Mar. 24, 2015

(54) VIDEO ENCODER/DECODER, METHOD AND COMPUTER PROGRAM PRODUCT

(75) Inventor: Gisle Bjoentegaard, Oppegaard (NO)

(73) Assignee: Cisco Technology, Inc., San Jose, CA (US)

( * ) Notice: Subject to any disclaimer, the term of this patent is extended or adjusted under 35 U.S.C. 154(b) by 578 days.

(21) Appl. No.: 13/027,979

(22) Filed: Feb. 15, 2011

(65) Prior Publication Data

US 2011/0228856 A1 Sep. 22, 2011

Related U.S. Application Data

(60) Provisional application No. 61/305,360, filed on Feb. 17, 2010.

(30) Foreign Application Priority Data

Feb. 17, 2010 (NO) .................................. 20100241

(51) Int. Cl.
*H04N 7/12* (2006.01)
*H04N 11/02* (2006.01)
(Continued)

(52) U.S. Cl.
CPC ........... *H04N 19/198* (2013.01); *H04N 19/107* (2013.01); *H04N 19/136* (2013.01); *H04N 19/147* (2013.01); *H04N 19/172* (2013.01); *H04N 19/176* (2013.01); *H04N 19/196* (2013.01); *H04N 19/567* (2013.01); *H04N 19/61* (2013.01)
USPC ............ 375/240.24; 375/240.14; 375/240.16; 375/240.15; 375/240.27

(58) Field of Classification Search
CPC .................. H04N 19/00381; H04N 19/00369; H04N 19/00672; H04N 19/0003; H04N 18/00139; H04N 19/00278; H04N 19/00175; H04N 19/00781; H04N 19/00266
USPC ...................................................... 375/240.24
See application file for complete search history.

(56) References Cited

U.S. PATENT DOCUMENTS

2007/0274396 A1* 11/2007 Zhang et al. ............. 375/240.24
2008/0240240 A1 10/2008 Kodama

FOREIGN PATENT DOCUMENTS

EP 1 610 561 A2 12/2005
EP 1 610 561 A3 12/2005
(Continued)

OTHER PUBLICATIONS

International Search Report and Written Opinion issued May 11, 2011 in Application No. PCT/NO2011/000058.
(Continued)

*Primary Examiner* — Hee-Yong Kim
(74) *Attorney, Agent, or Firm* — Lempia Summerfield Katz LLC

(57) ABSTRACT

A video encoder/decoder device, method, and computer program product combine to enhance entropy encoding by using different calculation approaches for assessing costs of using different encoding modes for a video encoding. Moreover, frames in a sequence, and/or sub-frames within a frame may have lowest cost coding modes selected using different cost calculation approaches. One exemplary cost calculation is SAD and another is SSD. A net effect is better subjective video quality for a given bitrate, with reduced encoder complexity, especially when recognizing the lesser amount of computational resources required to support SAD as opposed to SSD.

15 Claims, 7 Drawing Sheets

(51) Int. Cl.
*H04N 11/04* (2006.01)
*H04N 19/107* (2014.01)
*H04N 19/136* (2014.01)
*H04N 19/147* (2014.01)
*H04N 19/172* (2014.01)
*H04N 19/176* (2014.01)
*H04N 19/196* (2014.01)
*H04N 19/567* (2014.01)
*H04N 19/61* (2014.01)

(56) References Cited

FOREIGN PATENT DOCUMENTS

| WO | WO 2007/084475 | A2 | 7/2007 |
| WO | WO 2007/084475 | A3 | 7/2007 |

OTHER PUBLICATIONS

Norwegian Search Report issued Nov. 26, 2010, in Patent Application No. 20100241.

International Type Search Report issued Aug. 26, 2010, in Patent Application No. 20100241.

Heiko Schwarz, et al., "An Improved H.26L Coder Using Lagrangian Coder Control", ITU Telecommunications Standardization Sector Study Group, vol. 16, XP 2268624, Oct. 18, 2001, pp. 1-8.

Gary J. Sullivan, et al., "Rate-Distortion Optimization for Video Compression", IEEE Signal Processing Magazine, vol. 15, No. 6, XP 11089821, Nov. 1, 1998, pp. 74-90.

2007 IEEE International Conference on Signal Processing and Communications (ICSPC 2007), Nov. 24-27, 2007, Dubai, United Arab Emirates, "Improved Inter Prediction Based on Structural Similarity in H.264", Chun-Ling Yang, Hua-Xing Wang, Lai-Man Po, pp. 340-343.

* cited by examiner

VIDEO ENCODER/DECODER, METHOD AND COMPUTER PROGRAM PRODUCT

CROSS REFERENCE TO RELATED APPLICATION

The present application claims the benefit of the earlier filing date of U.S. provisional patent application, Ser. No. 61/305,360 filed in the USPTO on Feb. 17, 2010, the entire contents of which being incorporated herein by reference.

BACKGROUND

1. Field of the Disclosure

The present application relates to video encoders/decoders, methods and computer program product generally, and more particularly to video encoders/decoders, methods and computer program product that use different "Cost" functions for identifying a coding mode for coding a block of pixels.

2. Description of the Related Art

The "background" description provided herein is for the purpose of generally presenting the context of the disclosure. Work of the presently named inventor, to the extent it is described in this background section, as well as aspects of the description which may not otherwise qualify as prior art at the time of filing, are neither expressly or impliedly admitted as prior art against the present invention.

A video encoder typically divides each frame of original video data in blocks of pixels. In existing standards for video compression (e.g., MPEG1, MPEG2, H.261, H.263, and H.264) these blocks would normally be of sized 16×16 and be referred to as macroblocks (MB). It is anticipated in the yet to be implemented HEVC/H.265 standard, the blocks would typically be larger (e.g. 64×64) and might be rectangular, for instance at frame boundaries.

Typically, the blocks are processed and/or transmitted in raster scan order, i.e. from the top row of blocks to the bottom row of blocks, and from left to right within each row of blocks.

For each block of original pixel data, the encoding is typically performed in the following steps:
1. Produce prediction pixels using reconstructed pixel values from i) the previous frame (inter prediction), or ii) previously reconstructed pixels in the current frame (intra prediction). Depending on the prediction type, the block is classified as an inter block or an intra block.
2. Compute the difference between each original pixel and the corresponding prediction pixel within the block.
3. Apply a two-dimensional transform to the difference samples resulting in a set of transform coefficients.
4. Quantize each transform coefficient to an integer number.
5. Perform lossless entropy coding of the quantized transform coefficient.
6. Apply a two-dimensional inverse transform to the quantized transform coefficient to compute a quantized version of the difference samples.
7. Add the prediction to form the reconstructed pixels for the current block.

Video encoders can further divide blocks of pixels into sub-blocks. Typically, the blocks are of fixed (square) size, while the sub-blocks can be of various e.g. (rectangular) shapes. Also, the partitioning into sub-blocks will typically vary from one block to another.

Inter prediction is typically achieved by deriving a set of motion vectors for each sub-block. The motion vectors define the spatial displacement between the original pixel data and the corresponding reconstructed pixel data in the previous frame. Thus, the amount of data that needs to be transmitted to a decoder can be greatly reduced if a feature in a first frame can be identified to have moved to another location in a subsequent frame. In this situation, a motion vector may by used to efficiently convey the information about the feature that has changed position from one frame to the next.

Intra prediction is typically achieved by deriving an intra direction mode for each sub-block. The intra direction mode defines the spatial displacement between the original pixel data and the previously reconstructed pixel data in the current frame.

Both motion vectors and intra direction modes are encoded and transmitted to the decoder as side information for each sub-block. In order to reduce the number of bits used for this side information, encoding of these parameters depends on the corresponding parameters of previously processed sub-blocks.

Typically, some form of adaptive entropy coding is used. The adaptation makes the entropy encoding/decoding for a sub-block dependent on previously processed sub-blocks. Entropy encoding is lossless encoding that reduces the number of bits that are needed to convey the information to a receiving site.

When selecting between coding modes for a block of pixels, a variety of different options are available. The selection of coding mode is conventionally selected for continuously use during the encoding operation of successive frames.

SUMMARY

The following paragraphs have been provided by way of general introduction, and are not intended to limit the scope of the appended claims. The described embodiments, together with further advantages, will be better understood by reference to the following detailed description taken in conjunction with the accompanying drawings.

There are a number of options for selecting coding modes when coding blocks of pixels and the selection of selection of particular coding modes would result in different "Cost." Cost is a measure of distortion and required bits to code a block or sub-block. As recognized by the present inventor, methods used in encoders for calculating distortion in some instances have been by way of sum of square differences (SSD) and in other instances sum of absolute differences (SAD). However, the present inventor recognized that both SSD and SAD need not be mutually exclusive when performing coding on multiple frames, or within a frame. Rather, an attribute of SSD is that it is able to handle large residual pixel values spread over a few pixels, while SAD is capable of handling smaller areas spread over a larger number of pixels. However, by using a mixed approach of combining SSD and SAD for different frames or subframes in a video sequence offers a benefit of better subjective video quality for a given bit rate and substantial complexity reduction at the encoder side because the SAD calculations require less computational resources than SSD.

According to these observations, a novel encoder/decoder, method and computer program product that employ a mixture of SSD and SAD in calculating rate distortion costs when deciding on a coding mode for encoding frames of pixels provides beneficial use of superior performance with less computational resources being required.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
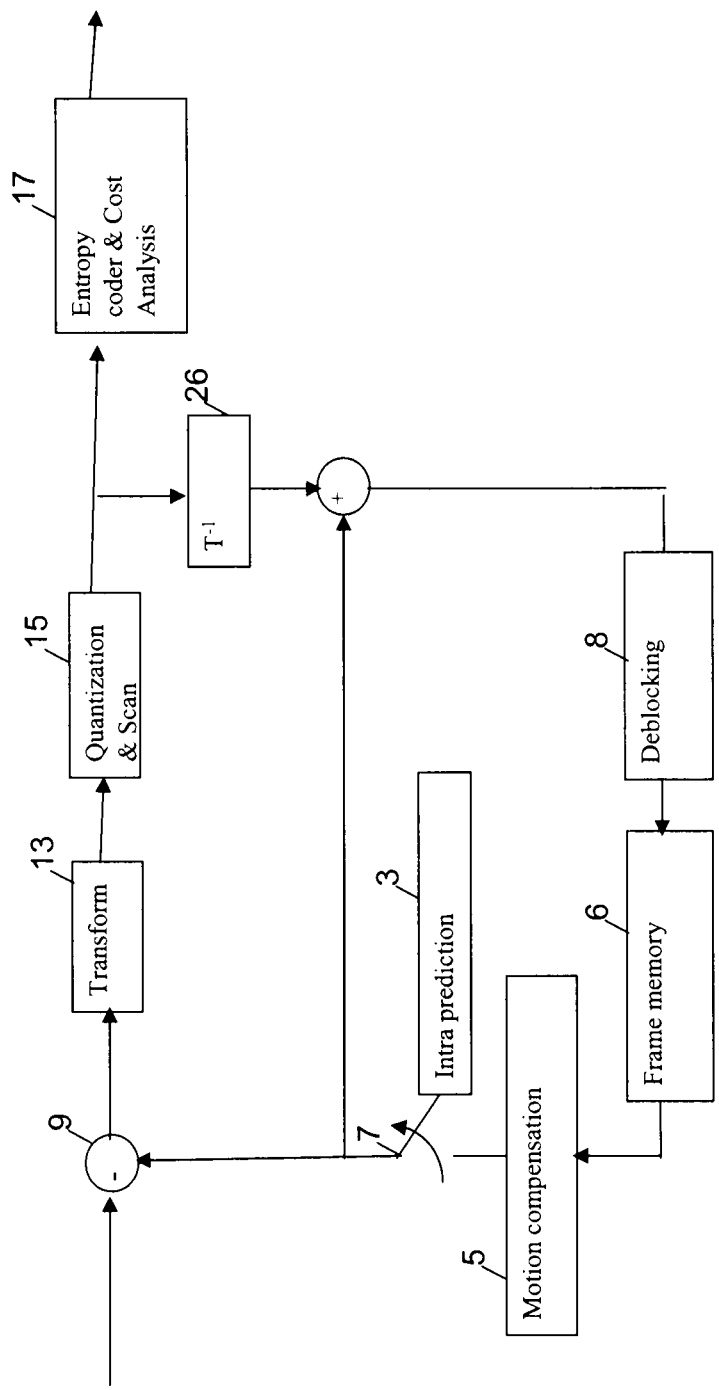
FIG. 1 is a block diagram of an exemplary video encoder that includes mixed SSD/SAD rate distortion cost analysis functionality for assisting in coding mode selection.
Figure 2:
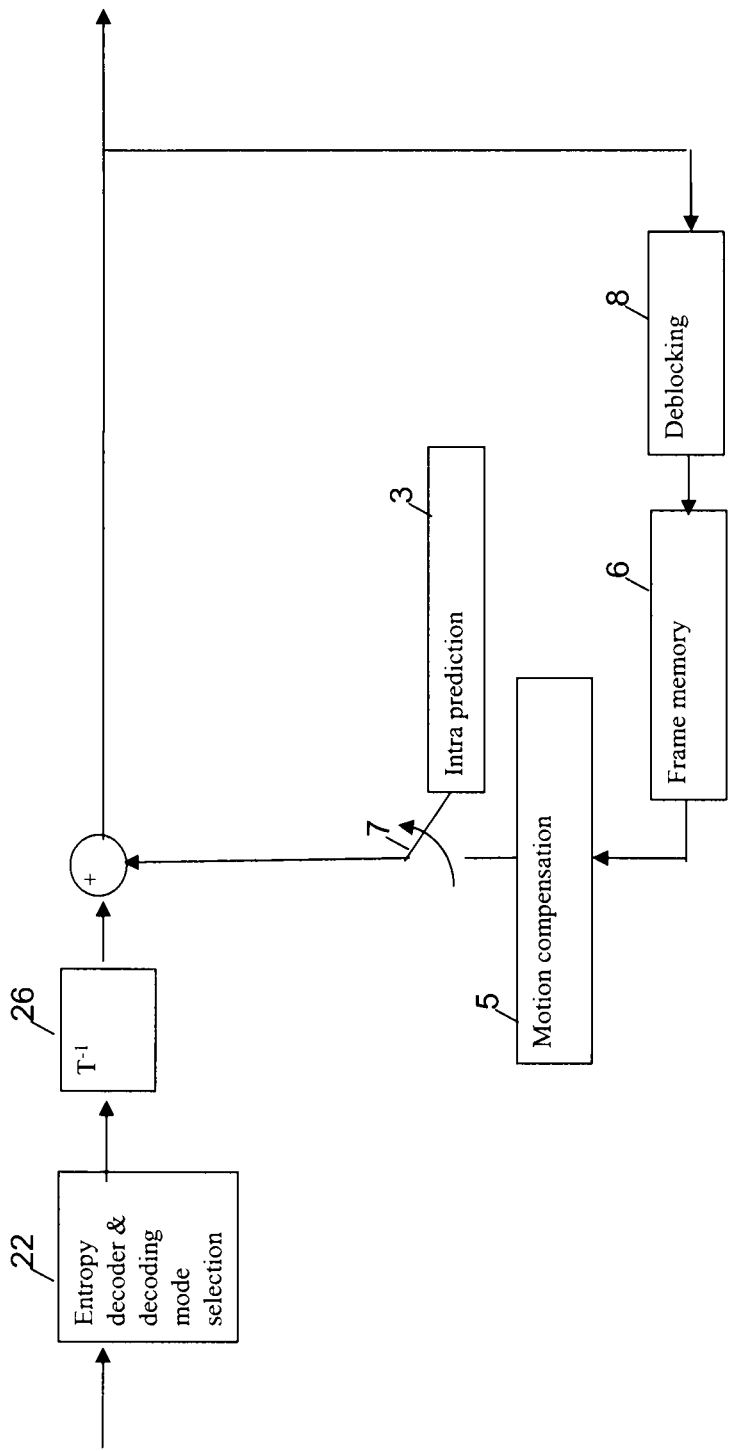
FIG. 2 is a block diagram of a video decoder that includes an ability to perform image reconstruction of an image encoded with the encoder of FIG. 1.

These and other features, aspects and advantages of the present invention will become better understood with regard to the following description, appended claims and accompanying drawings, wherein:

FIG. 1 is a block diagram of an encoder that for encoding video images. The corresponding decoding process for each block can be described (as indicated in FIG. 2) with many of the common elements from FIG. 1. However, in the decoder (FIG. 2), after entropy decoding 22 (to produce the quantized transform coefficients and select decoding mode) and two dimensional inverse transformation 26 on the quantized transform coefficient to provide a quantized version of the difference samples, the resultant image is reconstructed after adding the inter prediction and intra prediction data previously discussed.

Now, returning to the encoder of FIG. 1, a current frame as well as a prediction frame are input to a subtractor 9. The subtractor 9 is provided with input from an intra prediction processing path 3 and a motion compensation processing path 5, the selection of which is controlled by switch 7. Intra prediction processing is selected for finding similarities within the current image frame, and is thus referred to as "intra" prediction. Motion compensation has a temporal component and thus involves analysis between successive frames that is referred to as "inter" prediction.

The output of the switch 7 is subtracted from the pixels of the current frame in a subtractor 9, prior to being subjected to a two dimensional transform process 13. The transformed coefficients are then subjected to quantization in a quantizer 15 and then subject to an entropy encoder 17. Entropy encoding removes redundancies without losing information, and is referred to as a lossless encoding process. Many video encoding/decoding systems and methods apply a deblocking filter across boundaries between blocks. Moreover, a deblocking filter is applied to blocks in decoded video to improve visual quality and prediction performance by smoothing the sharp edges which can form between blocks when block coding techniques are used. The filter aims to improve the appearance of decoded pictures.

With regard to the entropy encoding, the encoding is generally lossless. After quantization the transform coefficients are represented as signed integer numbers. These numbers, or transform coefficients, are to be conveyed to the decoder without modifications. This is referred to as lossless representation or coding. There is generally a goal of using a minimum number of bits when representing the signed integer numbers.

To perform efficient coding, a model with coding modes is used in which the scanning of coefficients is part of the model. Then statistics on the occurrence of different events may be made to help characterize the performance of different coding modes. Based on these statistics, Variable Length Code (VLC) tables are used to actually perform the coding. In the interest of maximizing the amount of information per transmitted bit, the VLCs allocate short code words to frequent events, all done in accordance with the statistics. This will result in low bit usage as long as the data to be coded fit reasonably well with the underlying statistics. In the opposite case, very untypical data is coded with longer code words having more bits.

One aspect of the present disclosure is that it helps address situations where the data to be coded does not fit well within the "normal" statistics, and so an alternative approach is used as will be discussed.

Subsequent to the entropy encoder, the encoded data is arranged in network packets via a packetizer, prior to be transmitted in a bit stream.

However, the output of the quantizer 15 is also applied to an inverse transform and used for assisting in prediction processing. The output is applied to a deblocking filter 8, which suppresses some of the sharpness in the edges to improve clarity and better support prediction processing. The output of the deblocking filer 8 is applied to a frame memory 6, which holds the processed image pixel data in memory for use in subsequent motion processing.

Figure 3:
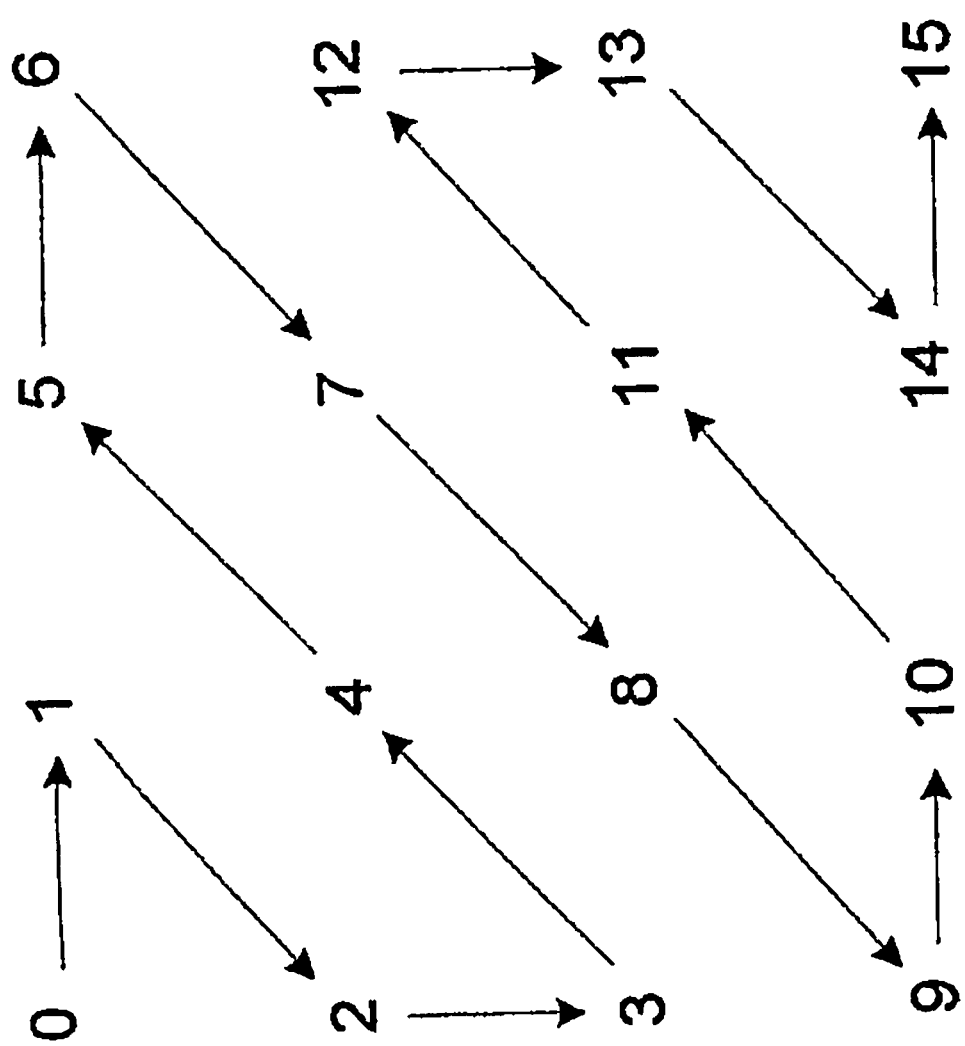
FIG. 3 is a zigzag scan path used when collecting transform coefficients calculated in a video encoder.

It should be noted that in the quantization and scanning operator 15, transform coefficients are commonly described as being positioned in low frequency coefficient (or DC coefficient) in the upper left-hand corner of the transform matrix (see e.g., FIG. 3). Then the horizontal and vertical spatial frequency increases to the right and downward with respect to the transform matrix 100 shown in FIG. 3. The scanning direction in FIG. 3 follows the arrow lines from position 0 through 15 in the order shown. This is referred to as zig-zag scanning. In entropy coding, the coefficients may be scanned in the direction indicated by the arrows (forward scanning) but in other cases the entropy coding may be more efficient if "inverse scanning" (high-to-low) frequency is used. Once again, frequency distribution of the transform coefficients will be different depending on the subject matter of the original images, and so selection of a best coding mode may be content dependent.

With respect to various modes of coding, there are a variety of options from which to select. For example, different predictions may be used to produce a residual that later is in turn to be coded. In this situation, the residual is equal to the pixels to be coded minus the prediction. This is one coding mode.

Another coding mode uses inter prediction when decoding picture data in a same frame to predict a block of pixels, where the size of the blocks to be predicted may vary. As an example, an H.264, 4×4, 8×8, 16×6 blocks may be used. Thus inter prediction using different sizes of blocks is yet another mode that can be used for coding.

Yet another mode of coding is one in which each block size has different procedures for calculating intraprediction. Once again intraprediction is associations within one frame, thus not considering a temporal component between frames. On the other hand, inter prediction does include a temporal component that compares different frames in time so that redundancies between frames in time may be exploited to limit the amount of data bits that need to be transmitted. Moreover, data from previously decoded frames may be used to calculate a prediction and so vectors are used to indicate the special displacement in the prediction process.

As yet another coding mode, the block size for inter prediction may vary. As an example, in H.264 a macroblock (MB) can be divided into many sub-blocks such as 16 4×4 blocks, 4 8×8 blocks, 2 16×8 blocks, etc. Each of these sub-blocks may be used for motion vectors to define the pixel displacement.

Another mode parameter is using several reference frames to calculate the displacement vector and thereby perform the prediction. Moreover, one or more reference frames are factors that define the mode used for performing encoding.

Also, the residual may be coded using different transform sizes such as in H.264, the sizes of 4×4, 8×8, and 16×16 pixels.

All the above are examples of one of any number of coding modes. The challenge is to identify a best coding mode given a set of frames and processing resources. When defining "best", a measure to be used is a combination of reconstruction error or distortion (D) and require bits to code the block (R). In H.264, the search for the best coding mode may be performed in two steps of finding displacement vectors and then coding in all possible modes.

With regard to how to find the displacement vectors, assume that the uncoded pixels of a block are $O(i,j)$ and the reconstructed pixels are $O'(i,j)$. For inter prediction the following cost function is calculated for each displacement vector:

$$\text{Cost1}=\text{sum}|O(i,j)-O'(i,j)|+\lambda1*Rm,$$

sum over i,j, where Rm is the number of bits to code the vector, and $\lambda1$ is a multiplier that depends on the quality of reconstruction. $\text{sum}|O(i,j)-O'(i,j)|$ is called the distortion (D). This way of calculating D is referred to as Sum of Absolute Differences (SAD).

The motion vector that result in minimum Cost1 is chosen.

Regarding the coding of all modes, in the full version, coding and reconstruction is performed for all combinations of prediction modes and all transform sizes. The bitrate used to code in each mode is called R. For each mode the following cost function is calculated:

$$\text{Cost2}=\text{sum}(O(i,j)-O'(i,j))^2+\lambda2*R.$$

$\lambda2$ is a multiplier suitable for this cost function.

This way of calculating D is referred to as Sum of Square Differences (SSD). SSD can be used since a usual objective measure of coding gain is Peak Signal to Noise Ratio (PSNR) which is also based on SSD calculations.

The coding mode that results in minimum Cost2 is chosen.

Although different costs are associated with defining the displacement vectors and coding modes, it is presently recognized that PSNR is not necessarily the objective measure that correlates best with subjective picture quality. Similarly, it is not necessarily so that SSD in calculating Cost2 results in a best subjective picture quality at a given bit rate. As a consequence, the present inventor recognized the benefits of using SDD to calculate Cost2 in some cases, but using SAD in other cases. In light of these observations, the embodiments that follow use SDD to calculate Cost2 in some cases and SAD in other cases. SSD and SAD used in the cost function each have their respective different strengths:

SSD offers accurate assessment when handling large residual pixel values spread over a few pixels, for instance a white spot on a dark background.

SAD offers accurate assessment when handling smaller errors spread over more pixels, for instance a small deviation of most pixels in a block. The general result is that pictures look less noisy.

Therefore, as aspect of the embodiments that follow is that they offer an accuracy benefit when using a mixture of SSD and SAD when calculating the Cost2 function mentioned above. Moreover, processing for some parts of the video sequence (e.g., selected frames or sub-frames) uses:

$$\text{Cost2}=\text{sum}(O(i,j)-O'(i,j))^2+\lambda2*R.$$

Processing for other parts of the video sequence use:
$\text{Cost2}=\text{sum}|O(i,j)-O'(i,j)|+\lambda3*R$ $\lambda3$ is different from $\lambda2$ due to the use of SAD instead of SSD.

Figure 4:
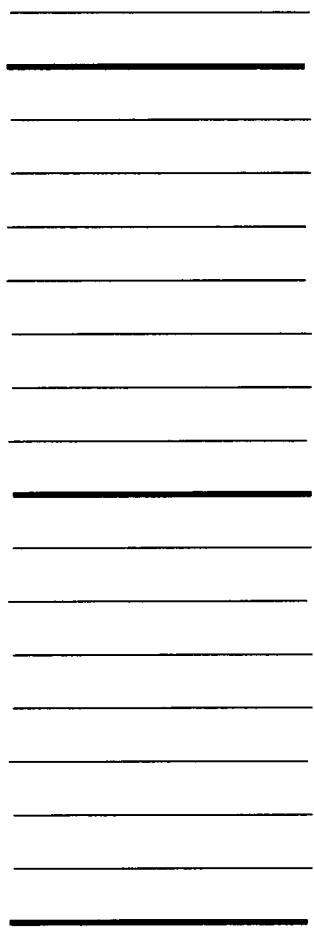
FIG. 4 is an exemplary frame sequence showing an allocation of SSD and SAD processing for different frames in a series of frames.

FIG. 4 shows an example of different frames being processed differently depending on whether SSD or SAD is used in calculating the Cost2 function when deciding the coding mode. In FIG. 4 each vertical line represents a frame. The bold lines indicate frames having a higher quality (HQ) and therefore higher bit usage than other frames. In this situation, SSD is used in the Cost2 calculation for the bold frames and SAD is used in the Cost2 calculation for the other frames. SSD may be used every N frames for example, where in the example N=8. However, N may also equal any integer number in this particular example.

Figure 5:
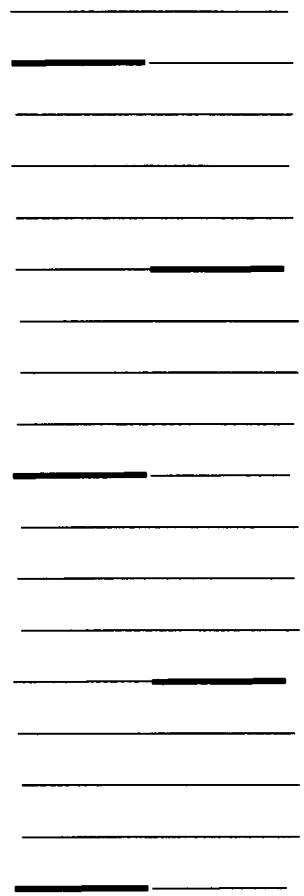
FIG. 5 is an alternative SSD and SAD frame processing arrangement, where a mixture of SSD and SAD are performed on sub-frame basis.

FIG. 5 shows a variation on the frame processing sequence shown in FIG. 4. In FIG. 5 the bold portions of a frame are processed using SSD, while the Cost2 function for the non-bold segments is performed using SAD calculations. Thus, within a given frame different portions of the frame may have the Cost2 calculation partitioned between SSD and SAD. While FIG. 5 shows portions of frames being calculated differently with SSD and SAD, it should be clear that a combination of the partitioned frames in FIG. 5 may be combined wholly or partly with the full frames analyzed in FIG. 4. Therefore, it should be understood that either whole or partial frames may have the Cost2 function calculated using SSD and/or SAD on a sub-frame basis or on adjacent or periodic or another mixture not expressly shown in FIG. 4 or 5.

Figure 6:
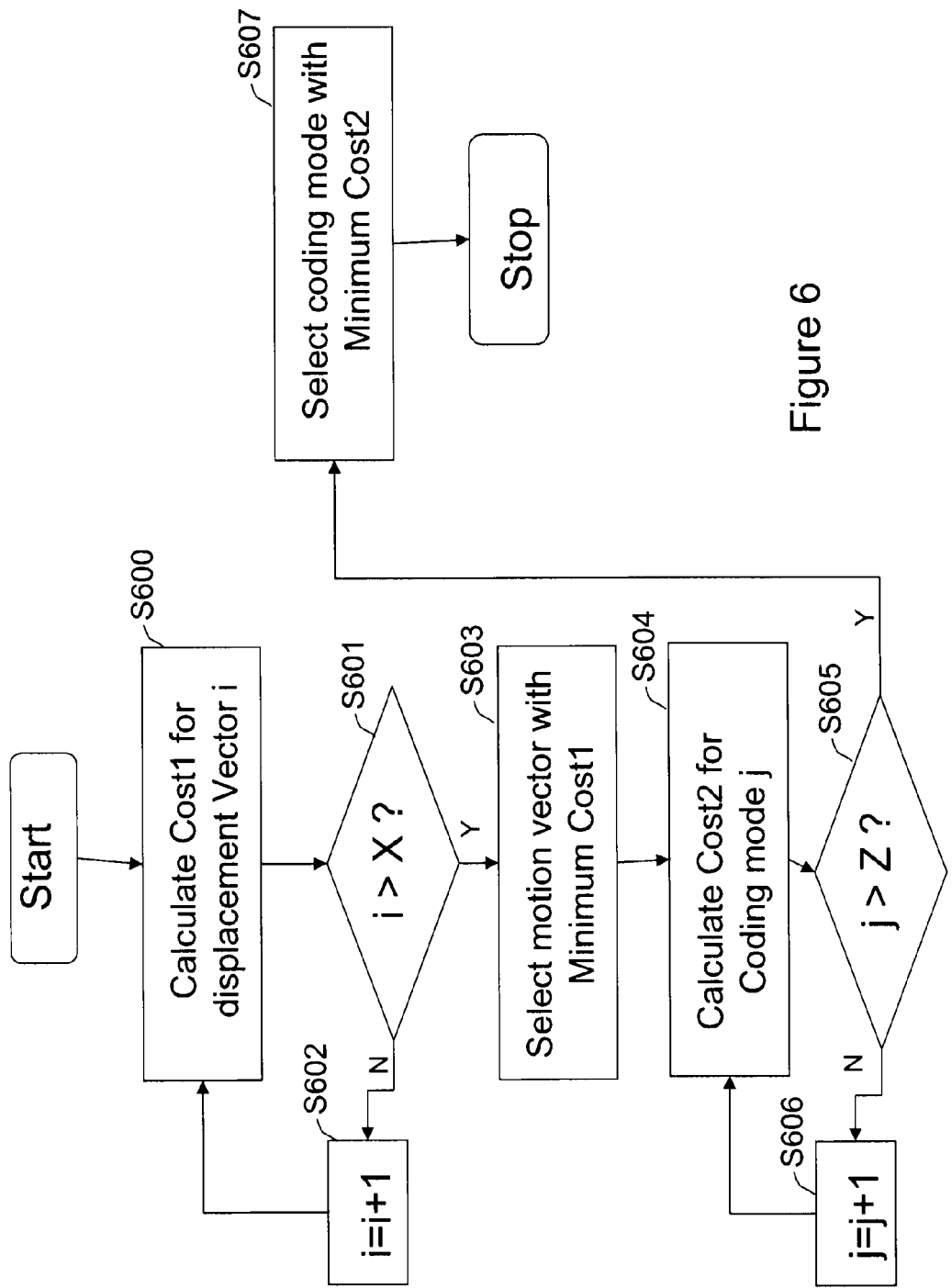
FIG. 6 is a flowchart of a process performed according to one embodiment in which costs are calculated for both the displacement vector and coding mode.

FIG. 6 shows a process flow for performing the cost to Cost1 and Cost2 functions for displacement vectors in coding modes according to the present disclosure. The process starts in step S600, where Cost1 is calculated for displacement vector i. The process then proceeds to step S601 where a query is made regarding whether i is greater than some predetermined value, X. If the response to the query in step S601 is negative, the process proceeds to step S602 where the frame counter is incremented and the process returns to step S600. However, if the response to the query in step S601 is affirmative, the process proceeds to step S603 where the motion vector is selected having a minimum Cost1 as calculated in step S600. The process then proceeds to step S604 where the Cost2 is calculated for a coding mode j. A greater discussion with regard to step S604 will be provided in FIG. 7. The process then proceeds to step S605 where a query is made regarding whether j is greater than some predetermined number Z, which represents the number of modes that are considered when performing the cost to calculation. If the response to the query in step S605 is negative, the process proceeds to step S606 where the mode indice is incremented and the process returns to step S604. However if the response to the query in step S605 is affirmative, the proceeds to step S607 where the minimum Cost2 is selected for a particular coding mode. Subsequently the process concludes, now knowing what the minimum Cost1 and Cost2 is for displacement vector and decoding mode that results in the minimum cost.

Figure 7:
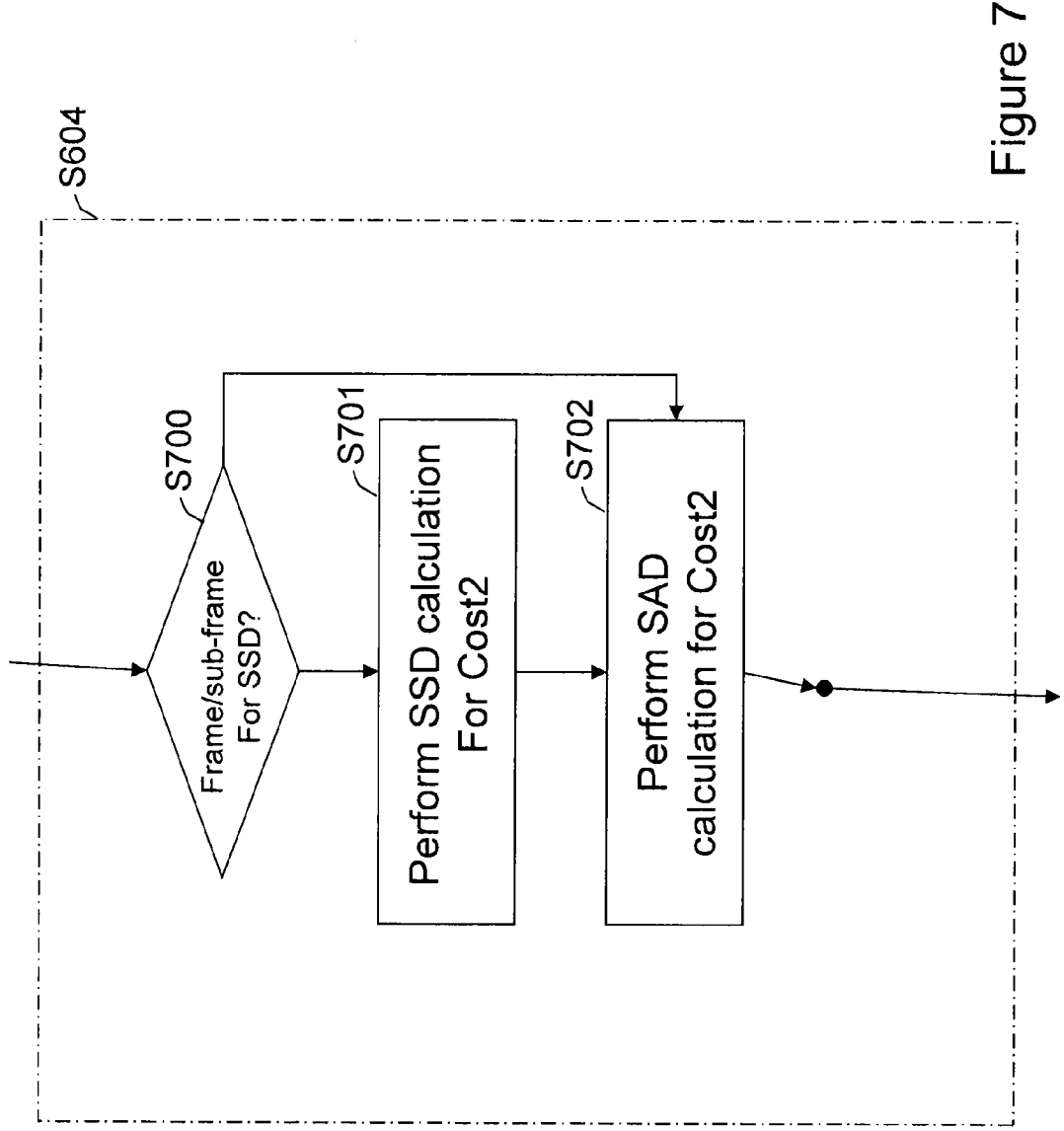
FIG. 7 is a flowchart showing a process flow for performing SSD and SAD calculations for costs associated with processing frames or sub-frames.

FIG. 7 is an expansion on step S604 from FIG. 6. In step S604 a query is made in step S700 regarding whether a frame or a part of a frame has been allocated for SSD calculation. If the response to the query in step S700 is negative, the process proceeds to step S702 where an SAD calculation is performed for Cost2 for that frame or sub-frame. However, if the response to step S700 is affirmative, the process proceeds to step S701 where an SSD calculation is performed for Cost2 on the frame or sub-frame. The output of steps S701 and S702 are then provided to step S605 in FIG. 6. Subsequently the process ends.

Figure 8:
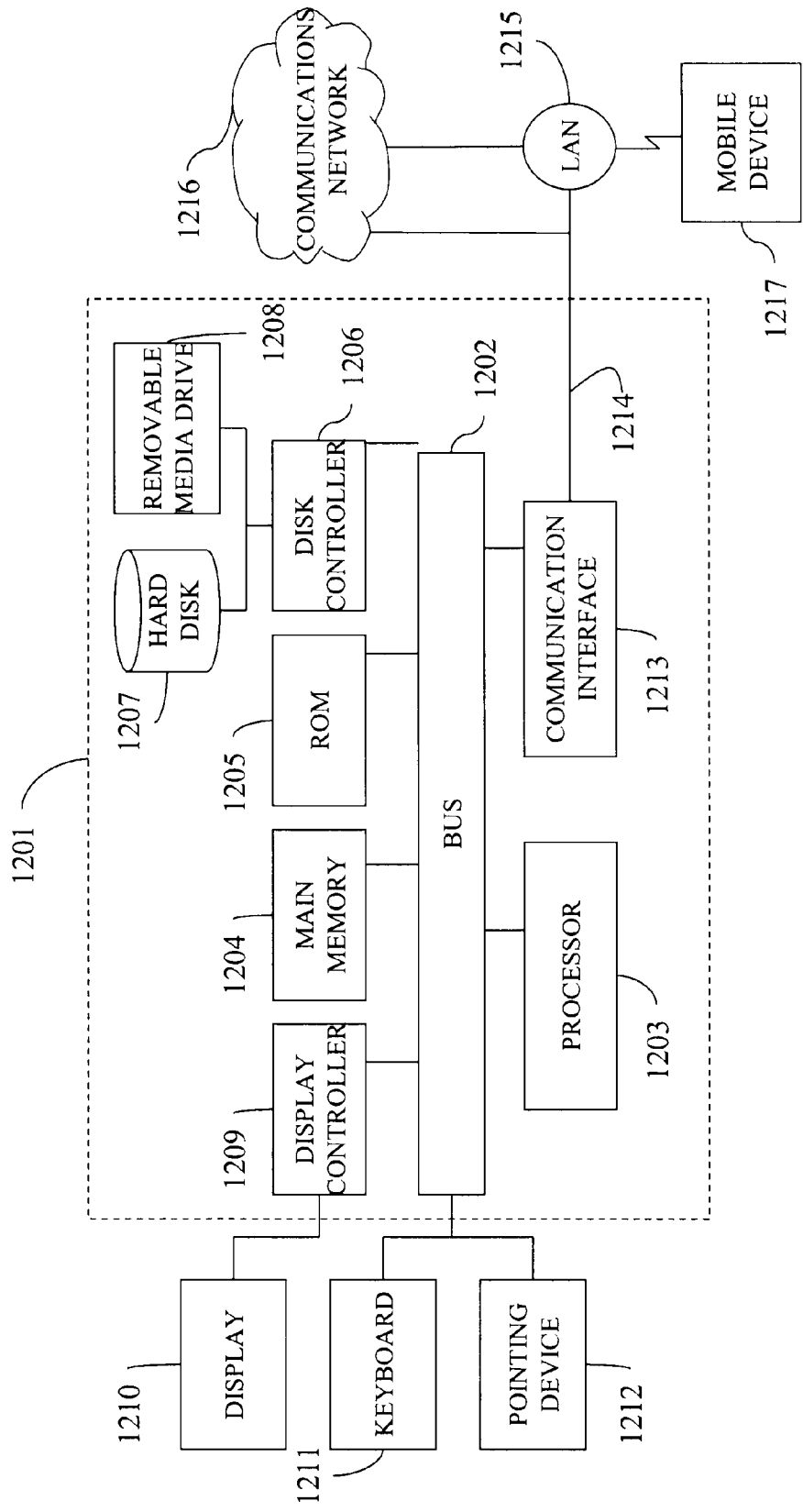
FIG. 8 is a block diagram of a computer implemented video conferencing endpoint that may host the apparatus, computer program product, and method as described herein.

FIG. 8 is a block diagram of a computer system 1201 upon which an embodiment of the present invention may be implemented. The computer system 1201 may be programmed to implement a computer based video conferencing endpoint that includes a video encoder or decoder for processing real time video images. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

Obviously, numerous modifications and variations of the present disclosure are possible in light of the above teachings. It is therefore to be understood that within the scope of the appended claims, the invention may be practiced otherwise than as specifically described herein.

Obviously, numerous modifications and variations of the present invention are possible in light of the above teachings. It is therefore to be understood that within the scope of the appended claims, the invention may be practiced otherwise than as specifically described herein.

The invention claimed is:

1. A video encoder comprising:
a processor configured to
calculate a Cost using uncoded pixels of a pixel block and reconstructed pixels of a reconstructed pixel block for each of a plurality of coding modes, and
select a coding mode from said plurality of coding modes that yielded a minimum Cost as calculated by said processor; and
an entropy encoder that encodes said pixel block using said coding mode, wherein said Cost is a rate distortion cost, wherein
said processor is configured to calculate said rate distortion cost for each of the plurality of coding modes using a sum of absolute differences as a first calculation process when there are relatively small errors spread over a relatively large number of pixels of the pixel block, and
said processor is also configured to calculate another rate distortion cost for another block of pixels using a sum of square differences as a second calculation process, when there are relatively large residual pixel values spread over a relatively small number of pixels of the pixel block, said another block of pixels being in a same frame or a next frame as said pixel block.

2. The video encoder of claim 1, wherein:
said block of pixels being pixels in a first frame, and
said another block of pixels also being pixels in said first frame.

3. The video encoder of claim 1, wherein:
said block of pixels being pixels in a first frame, and
said another block of pixels being pixels in a second frame.

4. The video encoder of claim 1, wherein:
said first calculation process determines Cost as sum|O(i, j)−O'(i, j)|+λ3*R, where R is bits, λ3 is a coefficient, O(i, j) represents the uncoded pixels, and O'(i, j) represents said reconstructed pixels.

5. The video encoder of claim 1, wherein:
said second calculation process determines Cost as sum(O(i, j)−O'(i, j))²+λ2*R, where R is bits, λ2 is a coefficient, O(i, j) represents the uncoded pixels, and O'(i, j) represents said reconstructed pixels.

6. The video encoder of claim 1, wherein:
said processor is configured to calculate rate distortion costs using a sum of absolute differences for groups of sequential pixel blocks or frames, and using a sum of square differences for a pixel block or a frame between the groups.

7. A video decoder comprising:
an entropy decoder that decodes an encoded pixel block using a decoding mode that was determined by a processor in an encoder to yield a minimum Cost, wherein said Cost being a rate distortion cost, said Cost being determined at said encoder using uncoded pixels of a pixel block and reconstructed pixels of a reconstructed pixel block for each of a plurality of coding modes, wherein
said entropy decoder decodes said encoded pixel block using a first decoding mode that corresponds with an encoding mode selected at said encoder as yielding the minimum Cost according to a sum of absolute differences as a first calculation process when there are relatively small errors in a pixel block, and said entropy decoder decodes another block of encoded pixels that was encoded with an encoding mode selected as yielding a minimum Cost according to a sum of square differences as a second calculation process when there are relatively large residual pixel values in the pixel block, said another block of pixels being in a same frame or a next frame as said pixel block.

8. The video decoder of claim 7, wherein:
said block of encoded pixels being encoded pixels in a first frame, and
said another block of encoded pixels also being encode pixels in said first frame.

9. The video decoder of claim 7, wherein:
said block of encoded pixels being encoded pixels in a first frame, and said another block of encoded pixels being encoded pixels in a second frame.

10. The video decoder of claim 7, wherein:
said first calculation process determines Cost as $\text{sum}|O(i,j)-O'(i,j)|+\lambda 3*R$, where R is bits, $\lambda 3$ is a coefficient, $O(i,j)$ represents the uncoded pixels, and $O'(i,j)$ represents said reconstructed pixels.

11. The video decoder of claim 7, wherein:
said second calculation process determines Cost as $\text{sum}(O(i,j)-O'(i,j))^2+\lambda 2*R$, where R is bits, $\lambda 2$ is a coefficient, $O(i,j)$ represents the uncoded pixels, and $O'(i,j)$ represents said reconstructed pixels.

12. The video decoder of claim 7, wherein said processor is configured to calculate rate distortion costs using the sum of square differences when the relatively large residual pixel values spread over a relatively small number pixels of the pixel block.

13. The video decoder of claim 7, wherein said processor is configured to calculate rate distortion costs using the sum of absolute differences when the relatively small errors are spread over a relatively large number of pixels of the pixel block.

14. The video decoder of claim 7, wherein:
said processor is configured to calculate rate distortion costs using the sum of square differences when the relatively large residual pixel values spread over a relatively small number pixels of the pixel block, and
said processor is configured to calculate rate distortion costs using the sum of absolute differences when the relatively small errors are spread over a relatively large number of pixels of the pixel block.

15. An apparatus comprising:
a processor configured to calculate rate distortion costs using uncoded pixels and reconstructed pixels for each of a plurality of coding modes and select a coding mode from the plurality of coding modes that yielded a minimum rate distortion cost as calculated by the processor,
wherein the processor is configured to calculate a first rate distortion cost for a first block of pixels using a sum of absolute differences as a first calculation process when there are relatively small errors spread over a relatively large number of pixels, and
wherein the processor is configured to calculate a second rate distortion cost for a second block of pixels using a sum of square differences as a second calculation process when there are relatively large errors spread over a relatively small number of pixels, the first block of pixels being in a same frame or a next frame as the second block of pixels.

* * * * *